United States Patent [19]
De Vries

[11] 3,753,164
[45] Aug. 14, 1973

[54] ACOUSTIC SURFACE WAVE FILTER

[75] Inventor: Adrian J. De Vries, Elmhurst, Ill.

[73] Assignee: Zenith Radio Corporation, Chicago, Ill.

[22] Filed: Apr. 10, 1972

[21] Appl. No.: 242,703

[52] U.S. Cl. .................. 333/30 R, 310/9.7, 310/9.8, 333/72
[51] Int. Cl. ........ H03h 7/10, H03h 7/30, H01v 7/00
[58] Field of Search ............................ 333/72, 30 R; 310/9.7, 9.8

[56] References Cited

UNITED STATES PATENTS

| | | | |
|---|---|---|---|
| 3,568,102 | 3/1971 | Tseng | 333/72 X |
| 3,387,233 | 6/1968 | Parker | 333/72 |
| 3,680,008 | 7/1972 | Yamamoto | 333/72 |

*Primary Examiner*—Rudolph V. Rolinec
*Assistant Examiner*—Hugh D. Jaeger
*Attorney*—John H. Coult et al.

[57] ABSTRACT

A surface-wave filter has an input transducer for launching acoustic surface waves together with an output transducer that responds to those waves for developing an output signal. The input transducer also is capable of producing undesired bulk waves to which the output transducer may also respond. However, such bulk-wave response is prohibited by a diverter, such as a surface coating that modifies the direction of the surface-wave path relative to that of the bulk waves, so that the output transducer may be oriented to respond only to the desired acoustic surface waves.

21 Claims, 11 Drawing Figures

Patented Aug. 14, 1973 3,753,164

2 Sheets-Sheet 1

ACOUSTIC SURFACE WAVE FILTER

BACKGROUND OF THE INVENTION

The present invention pertains to surface-wave filters. More particularly, it relates to surface-wave filters in which spurious output signals are reduced.

It is known that an electrode array composed of a pair of interleaved combs of conducting teeth coupled to a piezoelectric medium may be used to launch acoustic surface waves on that medium. The surface waves may then be converted back into electric signals by a similar array of conductive teeth. The device exhibits frequency selectivity, thereby eliminating the need for the critical and much larger components normally associated with selective circuitry. By reason of its small size, it is particularly useful in conjunction with solid-state functional integrated circuitry. A number of different versions of such devices, together with various modifications and adjustments thereof, are described and others are cross-referenced in U.S. Pat. No. 3,482,840 issued June 1, 1971 and assigned to the same assignee as the present application.

A typical surface-wave filter exhibits a frequency response characteristic generally of sin $x/x$ form. That is, it features a major lobe flanked by a succession of minor lobes with a null between each adjacent pair of lobes. This can be attractive in an application where it is desired to emphasize a certain frequency or frequencies while trapping one or more others. In a television intermediate-frequency amplifier, for example, the desired characteristic is that of a band-pass region embracing the carriers and modulated video information together with deep traps or nulls on each side of that region at the respective frequencies of the associated and adjacent-channel sound carriers. It is now known that the input and output transducers may have their individual characteristics tailored so as to shape the overall characteristic of a surface-wave filter in the manner required for such a television amplifier. In some cases, two or more of the filters may be combined so as to yield a composite characteristic of a particular shape different from the individual filter characteristic.

Whatever the approach in a given application, one limitation often present arises by reason of spurious signals developed by the output transducer. Different surface-wave reflection components have been found to result in spurious signals, and a number of different techniques have been advanced for the purpose of overcoming their effects. Another previously recognized source of spurious signal components is that of direct or capacitive coupling between the input and output transducers. To overcome this problem, shielding electrodes have been included in the path between the two transducers so as to inhibit direct coupling while yet permitting transmission of the desired acoustic surface waves.

Notwithstanding these and other improvements in surface-wave filters by means of the reduction or elimination of undesired signal components, spurious signals continue to be present in at least some of the many different possible filter embodiments that have been tried. Measurements on typical devices have revealed a spurious signal level varying between 20 and 50 db below the main response. At least when the selectivity is obtained in a single surface-wave filter, the spurious signal transmission is highly undesirable, particularly when the frequency of such a spurious signal falls at a point where it is desired to effect a null or deep trap which may need to be of the order of 60 db. To obtain such a trap, each of the input and output transducers must exhibit an individual null close to or at the desired trap frequency. In practice, it has been found that the maximum obtainable trap depth is essentially completely determined by the existence of spurious signals.

It is, accordingly, a general object of the present invention to provide a new and improved surface-wave filter in which the transmission of spurious or undesired signal modes is reduced.

It is a more specific object of the present invention to provide a new and improved surface-wave filter in which spurious modes arising by reason of bulk wave response are substantially inhibited.

A further object of the present invention is to provide several different structural techniques for reducing bulk mode response so as to afford a useful degree of flexibility in choice of design.

The invention thus relates to a selective transmission device that has a medium propagative of both surface and bulk acoustic waves. An input transducer is disposed on a surface of the medium and responds to an input signal for launching desired surface waves along a selected path in the surface. The input transducer also is productive of undesired bulk waves that travel in the body of the medium along a predetermined path. An output transducer also disposed on the medium responds to the surface waves for developing an output signal. At the same time, the output transducer also is capable of responding to bulk waves by developing spurious signals. Included in the device are diverting means for modifying the direction of one of the paths relative to the other so as to enable response of the output transducer to the desired surface waves while substantially reducing its response to the bulk waves. In one version, the diverting means includes a surface-wave reflector for changing the direction of travel of a portion of the surface waves; at the same time, that portion of the surface waves that continues on beyond the reflector is dissipated. Another version includes a material for modifying the propagation velocity of the surface waves unequally across the selected path; the output transducer then is oriented properly only relative to the changed direction of the surface waves. In a still different approach, it is the direction of bulk wave propagation which is changed; for this purpose, the bottom surface of the medium may slant to one side. In any case, it is preferred that the relative modification be such that the bulk waves are presented to the output transducer with at least substantially an effective $2\pi$ total range of phase variation.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numberals identify like elements, and in which:

In FIG. 1, an input signal source 10 is connected across an electrode array 2 which is mechanically coupled to a piezoelectric acoustic-wave-propagating medium or substrate 13 to constitute therewith an input transducer. An output electrode array 14 also is mechanically coupled to substrate 13 to constitute therewith an output transducer. Electrode arrays 12 and 14 are each constructed of two interleaved comb-type electrodes of a conductive material, such as gold or aluminum, which may be vacuum deposited on the smoothly lapped and polished planar upper surface of substrate 13. The piezoelectric material is one, such as PZT or lithium niobate, that propagates acoustic surface waves.

DESCRIPTION OF THE PREFERRED EMBODIMENT

Figures 1, 2A, 2B, 3, 4, 5:
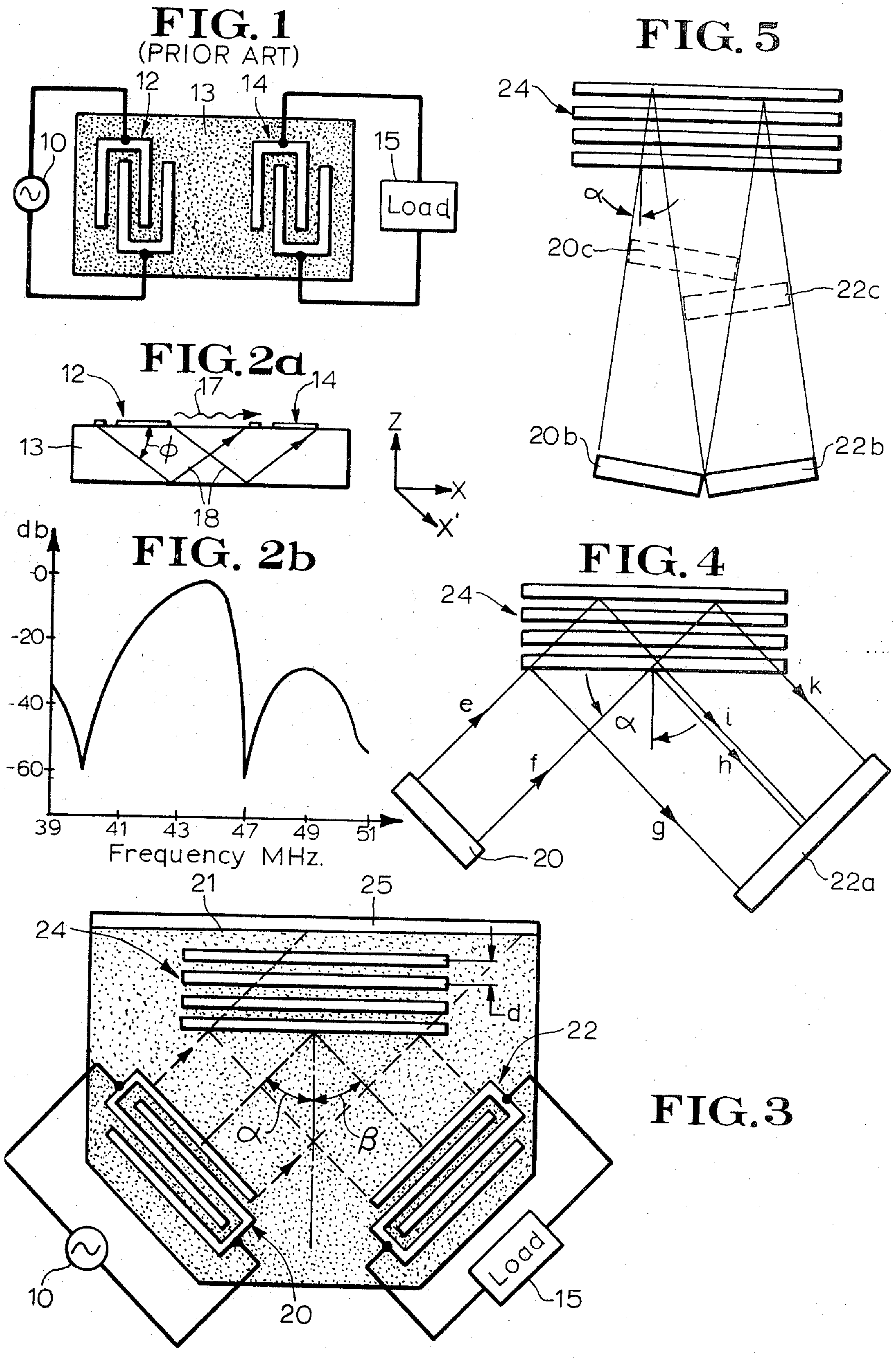
FIG. 1 is a partly-schematic plan view of a now-known acoustic-wave transmitting device.
FIG. 2*a* is a side-elevational view of the device in FIG. 1 together with a schematic representation of wave action.
FIG. 2*b* is a surface-wave filter characteristic that corresponds to a television intermediate-frequency-amplifier response characteristic.
FIG. 3 is a partly-schematic plan view of an embodiment in which bulk-mode response is reduced.
FIGS. 4 and 5 schematically illustrate variations that may be made in the embodiment of FIG. 3.

In operation, direct piezoelectric surface-wave transduction is accomplished by input transducer 12. Periodic electric fields are produced across the comb array when a signal from source 10 is applied to the electrodes. These fields cause perturbations or deformations of the surface of substrate 13 by piezoelectric action. Efficient generation of surface waves occurs when the strain components produced by the electric fields in the piezoelectric substrate substantially match the strain components associated with the surface-wave mode. The mechanical perturbations travel along the surface of substrate 13 as generalized surface waves representative of the input signal. At output transducer 14, the surface waves are converted to an electric signal for transmission to a load 15 connected across the two interleaved combs in the output transducer.

In an example wherein the surface wave filter is utilized in the intermediate-frequency stages of a television receiver and the substrate material is PZT, the teeth of both transducers 12 and 14 are each about twelve microns wide and are separated by a center-to-center spacing of 24 microns for the application of an intermediate-frequency signal in the standard 40 mHz range. The spacing between transducer 12 and transducer 14 is on the order of 80 mils and the width of the wavefront is approximately 0.1 inch.

The potential developed between any given pair of successive teeth in electrode array 12 produces two waves traveling along the surface of substrate 13, in opposing directions, perpendicular to the teeth for the illustrative case of a piezoelectric substrate which is poled perpendicularly to the surface. When the center-to-center distance between the teeth is one-half the acoustic wavelength in substrate 13 at the desired input signal frequency (the so-called center or synchronous frequency), relative maxima of the output waves are produced by piezoelectric transduction in transducer 12. For increased selectivity, additional electrode teeth are added to the comb patterns of transducers 12 and 14. Further modifications and adjustments are described and others are cross-referenced in the aforementioned Letters Patent for the purpose of particularly shaping the response presented by the filter. Techniques are also there mentioned for attenuating or advantageously making use of the one of the two surface waves that travels to the left from transducer 12 in FIG. 1. It will suffice for purposes of understanding the present invention to consider only the acoustic surface waves that travel to the right from transducer 12 toward transducer 14.

In FIG. 2*a*, rippled arrow 17 represents the desired acoustic surface waves launched by transducer 12 and responded to by transducer 14. In addition, transducer 12 is productive of waves in the bulk mode as indicated by arrows 18. The magnitude of the bulk waves received by transducer 14, and the frequency range over which they occur, depend in any given case on such factors as the particular configuration of the combs, the thickness of substrate 13 and the roughness of its back surface. To the extent responded to by output transducer 14, the bulk waves result generally in decreased depth of the nulls and particularly with respect to the nulls above the synchronous frequency. In FIG. 2*b*, which presents a typical desired frequency response characteristic for a filter formed with a lithium niobate substrate, it thus is found that bulk wave response causes the null at approximately 47 mHz to be substantially shallower than illustrated.

With input transducer 12 being designated to generate a surface wave of velocity $V_s$ at a center frequency $f_o$, it will also generate a bulk wave at some other frequency f and of a velocity $V$ that travels in the XZ plane in a direction X' that forms an angle $\phi$ to the direction X of surface wave propagation. For a ceramic such as PZT, direction Z would represent the poling axis. These different directions are indicated in the coordinate diagram included in FIG. 2*a*. The bulk-wave frequency $f$, at which maximum bulk-wave generation occurs, may be determined from the expression:

$$f = Vf_o/V_s\cos\phi$$

In the embodiment of FIG. 3, a reflector is included for diverting the direction of propagation of a portion of the acoustic surface waves, thus modifying that direction relative to the path of the bulk waves in the device. This enables the output transducer to respond essentially only to the desired surface waves. In more detail, an input transducer 20, across which source 10 is coupled, is disposed in a first location on a wave propagating substrate 21. Disposed at a second location on substrate 13 is an output transducer 22 across which load 15 is coupled. Also included on the propagating surface of substrate 21 is a reflector 24 which intercepts the waves launched by transducer 20 and reflects a portion of them to output transducer 22. Beyond reflector 24 and also disposed on substrate 21 is an attenuator 25, of rubber, soft plastic or a substance having an acoustic inpedance close to that of the substrate, which dissipates that portion of the surface waves passing on through reflector 24. Alternatively, that portion may be effectively dissipated by roughening or serrating the substrate so as to widely disperse those waves.

As here implemented, reflector 24 is in the form of a series of conductive ribbons. The oncoming acoustic surface waves are reflected by reason of a shorting of electric fields by the ribbons and a periodic disturbance of the propagating surface caused by the mass of the ribbons. In practice, it has been observed that a reflector of forty ribbons is capable of reflecting as much as 70 percent of an incident wave. In an alternative, the individual reflective elements may take the form of grooves or other disturbances in the surface.

By reason of the "bending" of the acoustic surface-wave path, the bulk waves produced by input transducer 20 normally will not be intercepted by output transducer 22. With both the input and output transducers having a null at a desired trap frequency, for example, the bulk waves thus are diverted so that, even if having a frequency corresponding to that of the desired trap, they are primarily dissipated against the sidewalls of the substrate and do not, to any significant extent, find their way to the output transducer. At the same time, the unreflected portion of the surface waves also is dissipated so as not to find its way into interaction with the output transducer by another and perhaps delayed path.

In general, transducers 20 and 22 desirably are aligned with respect to reflector 24 so that the angle $\alpha$, between the normals to input transducer 20 and reflector 24, equals the angle $\beta$ between the normals to output transducer 22 and reflector 24. The latter is, in itself, capable of being highly frequency selective, the degree of selectivity being proportional to the number of individual ribbons. For maximum response at the assumed trap frequency $f$, the center-to-center distance between successive ribbons is chosen with respect to the wavelength $\lambda$ of the acoustic surface waves in accordance with the relationship:

$$d = \lambda/2\cos\alpha$$

While a possibility remains that bulk waves may reintroduce surface waves into reflector 24 that subsequently would reach output transducer 22, the overall efficiency of such a multi-conversion system may be sufficiently low to avoid any significant impairment. In any event, the overall selectively of the embodiment of FIG. 3 is determined by the combination of three elements, transducers 20 and 22 and reflector 24. Consequently, the filter is more selective than the simpler two-transducer structure of FIG. 1.

A variety of design considerations are to be taken into account with the approach of FIG. 3. For instance, the multiple-element reflector leads to a lateral spreading of the acoustic surface waves. This occurs because a portion of the oncoming energy is reflected by the first ribbon encountered and other increments of that oncoming energy are reflected by more distant ones of the ribbons. This is illustrated in FIG. 4 where it will be observed that the launched acoustic beam ef is reflected as a beam gh against the first reflector element but as a beam *ik* against the last element. This effect is similar to the multiple images appearing in an optical system having many partly reflective mirrors. The original beam ef thus is widened to a beam *gk*. As a result, the efficiency of output transducer 22*a* is reduced. Either the latter must be constructed to have longer electrodes, which then will not be transducing at optimum efficiency, or a portion of wave energy directed toward the output transducer will not be intercepted.

As shown in FIG. 5, the amount of such beam widening may be reduced by spacing input transducer 20*b* and output transducer 22*b* sufficiently far from reflector 24 that angle $\alpha$ is substantially reduced. Of course, this results in the introduction of larger time delays and the requirement of larger substrates. In principle, these latter possible disadvantages may be overcome by permitting the input and output transducers to overlap as depicted in dashed outline by input transducer 20*c* and output transducer 22*c* in FIG. 5. However, the close proximity of transducers 20*c* and 22*c* undesirably increases the opportunity for direct capacitive coupling between the two transducers. Moreover, some undesired parasitic response may result from surface waves transmitted backwardly from transducer 20*c* directly to transducer 22*c*.

Figures 6, 7A, 7B, 8, 9:
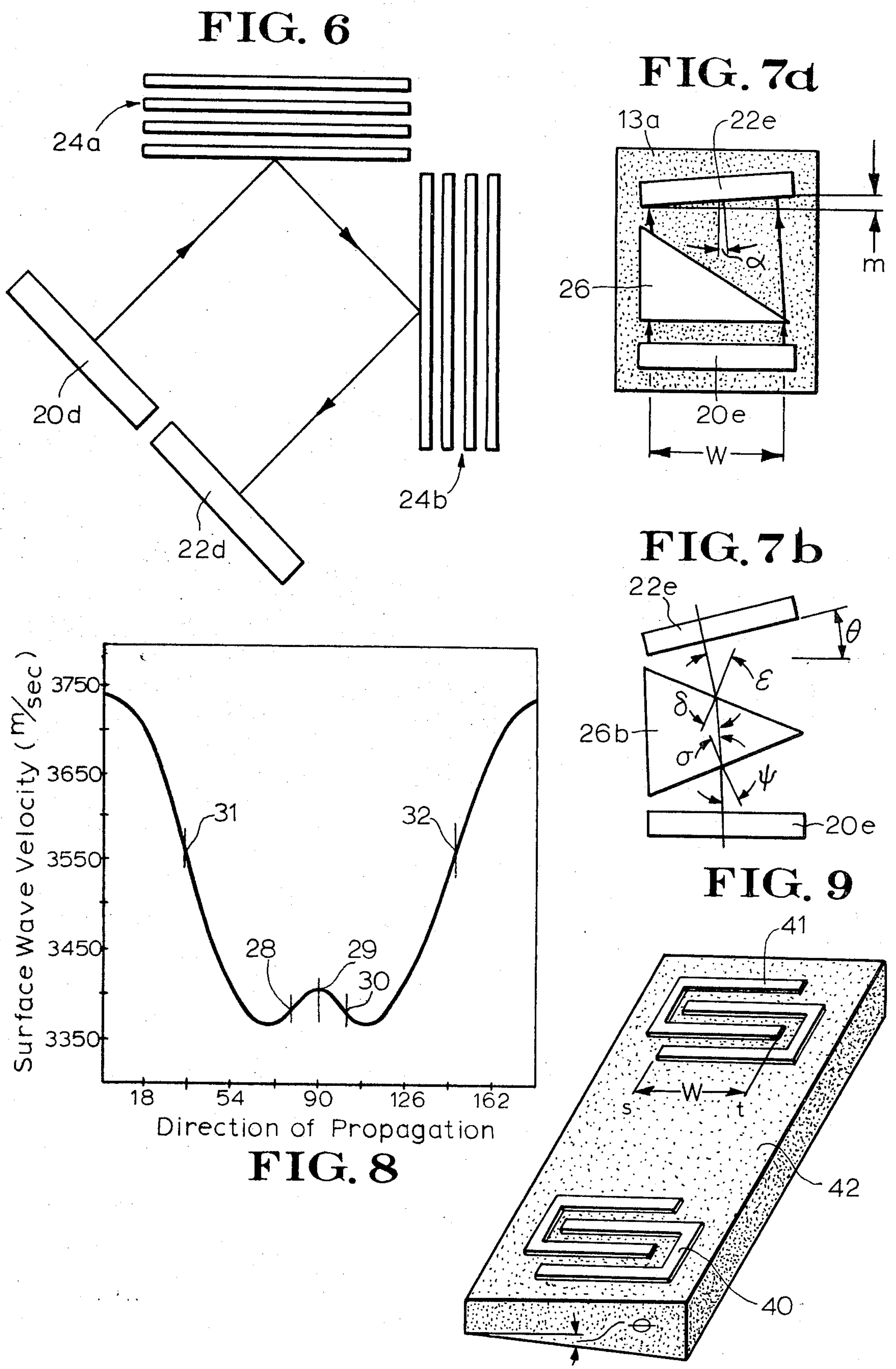
FIG. 6 is a schematic diagram of an embodiment alternative to that of FIG. 3.
FIG. 7*a* is a schematic plan view of a preferred alternative embodiment.
FIG. 7*b* is a schematic diagram of a generalized version of FIG. 7*a*.
FIG. 8 is a plot useful in connection with the explanation.
FIG. 9 is a perspective view, in partly diagramatic form, of a still further alternative embodiment.

In the arrangement of FIG. 6, the acoustic surface waves launched by an input transducer 20*d* are diverted by a first reflector 24*a* to a second reflector 24*b* from which the waves are then directed to an output transducer 22*d*. Ideally, reflectors 24*a* and 24*b* are each disposed at an angle of 45° to the surface-wave path and at a right angle with respect to each other. Advantageously, input and output transducers 20*d* and 22*d* are collinear and, when using an anisotropic substrate like lithium niobate that has a maximum coupling factor only in a certain specific direction, both may be properly oriented so as to exhibit a very high efficiency. Moreover, by forming the transducers so that their respective electrodes are parallel, the surface wave velocity is the same for both. This assists in obtaining exactly the same center frequency for both transducers. Of course, the addition of the second reflector serves to increase the overall selectivity while at the same time it does introduce an additional increment of loss. As a specific alternative to the illustrated form of the embodiment, the edges of the piezoelectric substrate itself may be so located and oriented as to serve the functions of the two reflectors.

A preferred mode of diversion of the acoustic surface waves, relative to the bulk waves, is employed in the embodiment of FIG. 7*a*. In this case, a material, such as a metallized coating 26, is disposed on the propagating surface between an input transducer 20*e* and an output transducer 22*e* all affixed to a substrate 13*a*. Across its width, material 26 is of varying length in the direction of surface wave propagation. Consequently, it serves to modify the velocity of propagation of the surface waves unequally across the width of the path of propagation. Output transducer 22*e* is oriented relative to the resultant change in direction of the surface wave path in a manner so as to exhibit maximum response to the diverted surface waves while also exhibiting minimum response to the bulk waves.

It is known that a metallic layer in the path of the surface waves functions to reduce the wave velocity. For example, in the Z-direction of Y-cut lithium niobate, the velocity difference may be as much as 2½ percent. As particularized in FIG. 7*a*, the length of the conductive coating is of the order of forty wavelengths along its left-hand or longer side. By reason of its difference in length across the path, the surface wavefronts are tilted. Accordingly, output transducer 22*e* similarly is tilted by a distance m so that its electrodes are properly aligned with respect to the oncoming surface waves. At the same time, the amount by which the output transducer is tilted is such that the bulk waves presented to it exhibit at least substantially an effective 2 $\pi$ total range of phase variation. That is, along a transducer electrode, the bulk wave phase at any instant changes throughout a phase angle of 2 $\pi$ or an integral multiple thereof. In consequence, there is total electrical cancellation along the length of each transducer electrode.

In more detail, transducer 22e is tilted so that an oncoming bulk wave has a propagation vector which forms an angle $\alpha$ with the normal to the transducer. By integrating the effective voltage introduced by the wave along the width of the transducer, it may be shown, to a first approximation and for small tilt angles, that the response varies in accordance with the relationship:

$$\sin(W\alpha/\lambda)\ \pi/(W\alpha/\lambda)\ \pi$$

where $W$ is the transducer width and $\lambda$ is the separation of wavefronts at the surface for bulk waves. The tilt distance $m$ equals $W\alpha$. The function expressed by equation (3) exhibits a minimum for values of the denominator that are multiples of $\pi$. Thus, the first minimum is found for $m = W\alpha = \lambda$. By tilting transducer 22e in satisfaction of the expression:

$$W\alpha = n\lambda$$

where $n$ is any integer other than zero, the transducer exhibits minimum response to the bulk waves. Under this condition, the voltages along the width of the transducer vary over an effective range of 2 $\pi$ and, hence, algebraically add to zero.

Having selected the amount by which output transducer 22e is to be tilted, coating 26 is then shaped to effect the appropriate amount of refraction of the surface waves so taht maximum desired response thereto also is exhibited by the output transducer. Coating 26 functions as an acoustic prism, in this case being in the form of a right triangle having its base facing and parallel to input transducer 20e. Its hypotenuse thus faces the output transducer. In addition, the hypotenuse defines an angle relative to the input transducer which satisfies the relationship:

$$(\sin\gamma)/\sin\ (\gamma+\alpha) = V_{sm}/V_s,$$

where $\gamma$ is the angle between the propagation vector of the surface waves initiating from input transducer 20e and a normal to the hypotenuse, $\alpha$ is the angle by which output transducer 22e is tilted from a normal to the last-mentioned propagation vector and also is the same as the angle $\alpha$ previously defined, $V_{sm}$ is the velocity of surface-wave propagation in the portion of substrate 13a underlying coating 26 and $V_s$ is the velocity of surface-wave propagation in the uncoated portions of substrate 13a.

More generally, refraction of the acoustic surface waves may be caused to occur in other ways. In FIG. 7b, for example, the total amount of refraction is divided between two different interfaces presented by a metallized coating 26b shaped so that refractive interfaces affect the surface waves both at entry to and exit from the coated area. That is, coating 26b presents angled interfaces in both instances. Thus, the first relationship is that of:

$$\sin\psi/\sin\sigma = V_s/V_{sm}$$

where $\psi$ is the angle between the propagation vector of the surface waves initiating from transducer 20e and a normal to the leading edge of coating 26b, and $\sigma$ is the angle between that same normal and the propagation vector after the initial interfaces. The surface wave is then again refracted by the following interface. That is:

$$\sin\delta/\sin\epsilon = V_{sm}/V_s,$$

where $\delta$ is the angle between the normal to the following edge of coating 26b and the propagation vector of the surface waves approaching that edge and $\epsilon$ is the angle between the last mentioned normal and the propagation vector of the waves leaving the last edge and ultimately impinging upon output transducer 22e. The total bending of the surface waves is $(\psi-\sigma) + (\epsilon-\delta)$. For proper alignment, the latter value is equal to the angle $\theta$ by which output transducer 22e is tilted relative to the input transducer.

Whatever the particular mechanism employed to cause a change in direction of the acoustic surface waves, the ultimate aim is to align the output transducer so that it responds maximally to those waves. At the same time, the output transducer is oriented so as to respond minimally to the bulk wave products. In both FIGS. 7a and 7b, the different angles are exaggerated, as compared with actual practice, for clarity of illustration.

In each of the different embodiments, it is apparent that the input and output transducers must be accurately oriented so that surface-wave interaction may take place at a proper angle for maximum response. FIG. 8 illustrates the surface-wave velocity on a Y-cut substrate of lithium niobate as a function of the direction of propagation. Typically, point 29, at 90° between the direction of propagation and the direction of elongation of the digital electrodes, has been chosen in the design of at least most filters. However, in the embodiments of FIGS. 7a and 7b it is more desirable to select a different angle as a result of which any deviation from proper alignment during fabrication produces the same variation in synchronous frequency in both the input and output transducers. Such a condition is approximately met, for small angles between the transducers, at points 28, 30, 31 and 32 on the FIG. 8 curve. At each of those points:

$$d^2V_s/dP^2 = 0,$$

where $V_s$ is the surface-wave velocity and P is the direction of propagation. Because the coupling factor is much smaller at points 31 and 32, either of the other points 28 and 30 are preferred.

Finally, FIG. 9 depicts a different approach to the avoidance of bulk-wave transmission. In this case, it is the bulk waves which are diverted relative to the output transducer. To that end, an input transducer 40 and an output transducer 41 are spaced apart on a piezoelectric substrate 42. The effective width of the transmitted acoustic surface waves is again represented by the letter $W$ and those waves propagate along a path having a left hand edge $s$ and a right edge $t$. Insofar as acoustic surface-wave operation is concerned, the device of FIG. 9 is the same as that already described with respect to FIG. 1. In this case, however, the bottom surface of substrate 42 is tilted by $\theta$ radians in a direction perpendicular to the direction of the acoustic surface-wave propagation. Angle $\theta$ is selected to have a value so that, once again, the bulk waves presented to output transducer 41 exhibit an effective $2\pi$ total range of phase variation.

In operation, the effective phase shift $\Delta\phi$ of the bulk-wave components that may intercept the extreme sides $s$ and $t$ of output transducer 41 is expressed by the relationship:

$$\Delta\phi = 4\pi-(W\theta/\lambda_o)\tan\phi ,$$

where $\phi$ is the same as described in connection with FIG. 1 and $\lambda_o$ is the periodic wavelength spacing of the electrodes in transducers 40 and 41. For effective cancellation of the bulk waves, it is preferred to satisfy the relationship:

$$(W\theta/\lambda_o)\tan\phi = n/2,$$

where $n$ is any integer different from zero. Typically for a transducer with a width W of 60 wavelengths, cancellation occurs for a $\theta$ value of 1/60 radian or about 1° and a value of angle $\phi$ equal to 27.5°.

A number of different embodiments have been disclosed. Either the surface-wave path or the bulk-wave path is in some way diverted so that the two different waves will be unable to satisfy a condition in which both would reach and interact efficiently with the output transducer. Consequently, the output transducer is rendered at least less sensitive to whatever bulk waves may be present in the device. Spurious signals are inhibited that otherwise would detract from a selectivity characteristic exhibiting deep traps as may be desired to preclude the passage of signals at certain frequencies.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In a selective transmission device having a medium propagative of surface and bulk acoustic waves, an input transducer disposed on a surface of said medium and responsive to an input signal for launching desired surface waves along a selected path in said surface and also productive of undesired bulk waves traveling in the body of said medium along a predetermined path and an output transducer disposed on said surface of said medium responsive to said surface waves for developing an output signal while also being capable of responding to bulk waves by developing spurious signals, the improvement comprising:

diverting means included in said device for modifying the direction of said selected path to enable response of said output transducer to said surface waves while substantially reducing response of said output transducer to said bulk waves;

and means disposed in said selected path beyond said diverting means for dissipating surface waves.

2. A device as defined in claim 1 in which said diverting means includes a reflector disposed on said surface in said path selected for reflecting to said output transducer surface waves received from said input transducer.

3. A device as defined in claim 2 in which said output transducer has a greater width across said selected path than that of said input transducer.

4. A device as defined in claim 2 in which said input and output transducers have substantially the same width across said selected path.

5. A device as defined in claim 2 in which each one of said input and output transducers is disposed at least partially in the portion of said selected path between said reflector and the other.

6. A device as defined in claim 2 in which each one of said input and output transducers is disposed in a portion of said selected path exclusive of that of the other.

7. In a selective transmission device having a medium propagative of surface and bulk acoustic waves, an input transducer disposed on a surface of said medium and responsive to an input signal for launching desired surface waves along a selected path in said surface and also productive of undesired bulk waves traveling in the body of said medium along a predetermined path and an output transducer disposed on said surface of said medium responsive to said surface waves for developing an output signal while also being capable of responding to bulk waves by developing spurious signals, the improvement comprising:

diverting means, including a pair of reflectors successively disposed on said surface in said selected path with the first of said reflectors reflecting to the second waves received from said input transducer and the second of said reflectors reflecting to said output transducer waves received from the first, for modifying the direction of said selected path relative to said predetermined path to enable response of said output transducer to said surface waves while substantially reducing response of said output transducer to said bulk waves.

8. A device as defined in claim 7 in which said reflectors are each disposed at an angle of 45° to said selected path and at a right angle with respect to each other.

9. A device as defined in claim 7 in which said medium is anisotropically piezoelectric, and in which both said input and output transducers are oriented in a direction effecting substantially maximum transducer coupling factor.

10. In a selective transmission device having a medium propagative of surface and bulk acoustic waves, an input transducer disposed on a surface of said medium and responsive to an input signal for launching desired surface waves along a selected path in said surface and also productive of undesired bulk waves traveling in the body of said medium along a predetermined path and an output transducer disposed on said surface of said medium responsive to said surface waves for developing an output signal while also being capable of responding to bulk waves by developing spurious signals, the improvement comprising:

diverting means included in said device for modifying the direction of one of said paths relative to the other in an amount effecting presentation of said bulk waves to said output transducer with at least substantially an effective 2 $\pi$ total range of phase variation.

11. A device as defined in claim 10 in which said medium is anisotropically piezoelectric, and in which the orientation of both said input and output transducers is selected, relative to an orientation effecting maximum transducer response at a desired center frequency, such that deviation in orientation effects like variation in center frequency in both of said transducers.

12. A device as defined in claim 11 in which the orientation of said transducers is selected in satisfaction of the relationship:

$$d^2V_s/dP^2 = 0$$

where $V_s$ is the surface-wave velocity and $P$ is the direction of propagation.

13. In a selective transmission device having a medium propagative of surface and bulk acoustic waves, an input transducer disposed on a surface of said medium and responsive to an input signal for launching desired surface waves along a selected path in said surface and also productive of undesired bulk waves traveling in the body of said medium along a predetermined path and an output transducer disposed on said surface of said medium responsive to said surface waves for developing an output signal while also being capable of responding to bulk waves by developing spurious signals, the improvement comprising:

diverting means, including a material disposed on said surface in said selected path between said input and output transducer, for modifying the velocity of propagation of said surface waves unequally across the width of said selected path, said output transducer being oriented relative to the concomitant change in direction of said selected path in a manner to exhibit substantially maximum response to said surface waves and also being oriented to exhibit substantially minimum response to said bulk waves.

14. A device as defined in claim 13 in which said material is affixed to said surface and has a length along said selected path that changes across said width.

15. A device as defined in claim 13 in which said diverting means tilts said selected path by an angle $\alpha$, in which said output transducer is oriented relative to the tilted path to exhibit substantially maximum response to said surface waves at a desired center frequency, and in which said output transducer also is oriented relative to said bulk waves in substantial satisfaction of the relationship:

$$W\alpha = n\lambda.$$

where $W$ is the wavefront width of said surface waves, $n$ is an integer other than zero, and $\lambda$ is the apparent wavelength at the surface for the bulk waves.

16. A device as defined in claim 13 in which said material effectively is of right-triangular shape, having a base parallel to and facing said input transducer and a hypotenuse facing said output transducer and defining an angle with respect to said input transducer satisfying the relationship:

$$\sin\gamma/\sin(\gamma+\alpha) = V_{sm}/V_s,$$

where $\gamma$ is the angle between said selected path initiating from said input transducer and a normal to said hypotenuse, $\alpha$ is the angle by which said output transducer is tilted from a normal to said selected path initiating from said input transducer, $V_{sm}$ is the velocity of surface-wave propagation in the portion of said medium underlying said material and $V_s$ is the velocity of surface wave propagation in portions of said medium free of said material.

17. A device as defined in claim 13 in which said material effectively is of triangular shape, having a first interface facing said input transducer and defining an angle with respect thereto in accordance with the relationship:

$$\sin\psi/\sin\sigma = V_s/V_{sm},$$

where $\psi$ is the angle between the propagation vector of the surface waves initiating from said input transducer and a normal to said first interface, $\sigma$ is the angle between that same normal and the surface-wave propagation vector following said first interface, $V_{sm}$ is the surface-wave velocity in the portion of said medium underlying said material and $V_s$ is the surface-wave velocity in in portions of said medium free of said material; said material having a second interface facing said output transducer and defining an angle thereto in accordance with the relationship $$\sin\delta/\sin\epsilon = V_{sm}/V_s,$$

where $\delta$ is the angle between the normal to said second interface and the surface-wave propagation vector approaching said second interface and $\epsilon$ is the angle between the last-mentioned normal and the surface-wave propagation vector following said second interface.

18. A device as defined in claim 17 wherein said first and second interfaces together effect bending of said surface-wave propagation vector by an amount $(\psi-\sigma) + (\epsilon-\delta)$, and in which said output transducer is tilted by said amount relative to said input transducer.

19. In a selective transmission device having a medium propagative of surface and bulk acoustic waves, an input transducer disposed on a surface ef said medium and responsive to an input signal for launching desired surface waves along a selected path in said surface and also productive of undesired bulk waves traveling in the body of said medium along a predetermined path and an output transducer disposed on said surface of said medium responsive to said surface waves for developing an output signal while also being capable of responding to bulk waves by developing spurious signals, the improvement comprising:

diverting means, including an element disposed in said predetermined path, for modifying the direction of propagation of said bulk waves by an amount substantially inhibiting response by said output transducer thereto.

20. A device as defined in claim 17 in which said element is a face of said medium opposite said surface and defining a finite angle relative thereto.

21. A device as defined in claim 18 in which said angle is defined in a plane normal to said selected path and its value $\theta$ at least approximately satisfies the relationship:

$$(W\theta/\lambda_o)\tan\phi = n/2,$$

where $W$ is the wavefront width across said selected path, $\lambda_o$ is the wavelength of maximum response exhibited by said transducers, $n$ is any integer other than zero and $\phi$ is the angle between said selected and predetermined paths.

* * * * *